(12) United States Patent
Sagar et al.

(10) Patent No.: US 10,216,256 B2
(45) Date of Patent: Feb. 26, 2019

(54) POWER CONSERVATION OF COMPUTING COMPONENTS USING FORCED IDLE STATE

(71) Applicant: Microsoft Technology Licensing, LLC, Redmond, WA (US)

(72) Inventors: Abhishek Sagar, Redmond, WA (US); Paresh Maisuria, Issaquah, WA (US); James Anthony Schwartz, Jr., Seattle, WA (US); M. Nashaat Soliman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 15/284,189

(22) Filed: Oct. 3, 2016

(65) Prior Publication Data

US 2018/0095517 A1   Apr. 5, 2018

(51) Int. Cl.
*G06F 1/00*   (2006.01)
*G06F 9/48*   (2006.01)

(52) U.S. Cl.
CPC ......... *G06F 1/3287* (2013.01); *G06F 1/3234* (2013.01); *G06F 1/3296* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 6,751,741 B1 | 6/2004 | Kawahara et al. | |
| 7,243,247 B2 | 7/2007 | Oh | |
| 7,454,632 B2 | 11/2008 | Kardach et al. | |
| 8,225,121 B2 | 7/2012 | Sotomayor et al. | |
| 8,661,279 B2 | 2/2014 | Goodrum et al. | |
| 9,021,209 B2 | 4/2015 | Branover et al. | |
| 9,285,855 B2 | 3/2016 | Song et al. | |
| 2002/0007387 A1 | 1/2002 | Ginsberg | |
| 2009/0177422 A1* | 7/2009 | Cox | G06F 1/3203 702/64 |

(Continued)

OTHER PUBLICATIONS

K., Taylor, "C-states and P-states are very different", Published on: Mar. 12, 2008 Available at: https://software.intel.com/en-us/blogs/2008/03/12/c-states-and-p-states-are-very-different.

(Continued)

*Primary Examiner* — Nitin C Patel
(74) *Attorney, Agent, or Firm* — Liang IP, PLLC

(57) ABSTRACT

An operating system of a computing device determines an importance of the threads running on the computing device, such as assigning the importance of the threads as critical or non-critical. The operating system determines when there are no threads having at least a threshold importance (e.g., no critical threads), and forces one or more components of the computing device into a forced idle state in response to determining that there are no threads having at least the threshold importance. The forced idle state of a device component is a low power state, such as a state in which program instructions are not executed, so the computing device is forced into a forced idle state that reduces power usage in the computing device despite there being threads (e.g., non-critical threads) to be executed.

20 Claims, 4 Drawing Sheets

(56) References Cited

U.S. PATENT DOCUMENTS

| | | | |
|---|---|---|---|
| 2009/0177907 A1* | 7/2009 | Sotomayor, Jr. | G06F 1/3203 |
| | | | 713/340 |
| 2012/0246652 A1* | 9/2012 | King-Smith | G06F 9/4843 |
| | | | 718/102 |
| 2014/0149772 A1 | 5/2014 | Arora et al. | |
| 2014/0181554 A1* | 6/2014 | Manne | G06F 1/3234 |
| | | | 713/323 |
| 2014/0380084 A1 | 12/2014 | McKenney | |
| 2015/0355705 A1* | 12/2015 | Weissmann | G06F 1/3287 |
| | | | 713/322 |

OTHER PUBLICATIONS

Hwang, et al., "A predictive system shutdown method for energy saving of event-driven computation", In Proceedings of IEEE/ACM International Conference on Computer-Aided Design, Nov. 9, 1997, pp. 28-32.

Torres, Gabriel, "Everything You Need to Know About the CPU C-States Power Saving Modes", Published on: Sep. 5, 2008 Available at: http://www.hardwaresecrets.com/everything-you-need-to-know-about-the-cpu-c-states-power-saving-modes/.

Meisner, et al., "PowerNap: Eliminating Server Idle Power", In Proceedings of the 14th international conference on Architectural support for programming languages and operating systems, Mar. 7, 2009, pp. 205-216.

Benini, et al., "Monitoring system activity for OS-directed dynamic power management", In Proceedings of the international symposium on Low power electronics and design, Aug. 10, 1998, pp. 185-190.

\* cited by examiner

POWER CONSERVATION OF COMPUTING COMPONENTS USING FORCED IDLE STATE

BACKGROUND

As computing technology has advanced, computers have become increasingly commonplace in our lives. Many computing devices are designed to run on battery power, such as mobile phones, tablet computers, and so forth. Having such mobility with computing devices increases their usability, but is not without its problems. One such problem is that the wide variety of functionality provided by these computing devices consumes a significant amount of power. This leads to draining the battery, leaving the user unable to use the computing device until the computing device is recharged. This can lead to users being unable to use their devices in the manner they desire, and user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a computing device a determination is made to begin a process for forcing a component of the computing device into a forced idle state. As part of the process for forcing the component into the forced idle state, a verification is made at the computing device that no program threads satisfying a threshold importance are to be executed on the computing device. In response to determining that no program threads to be executed on the computing device satisfy the threshold importance, the component of the computing device is forced into the forced idle state.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
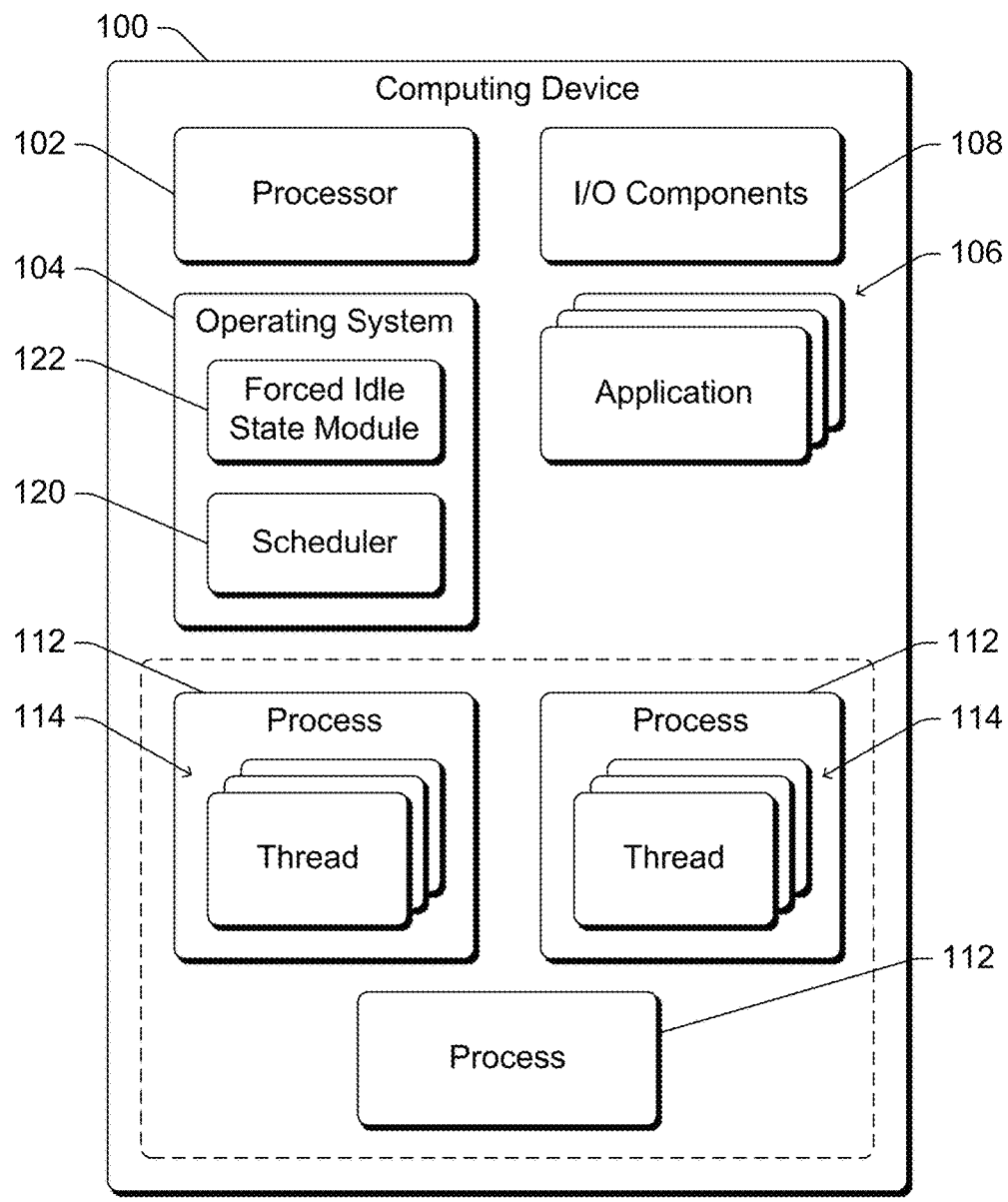
FIG. 1 is a block diagram illustrating an example computing device implementing the forced idle state for device components in accordance with one or more embodiments.

Forced idle state for device components is discussed herein. These device components can be processors of a device, or other hardware components or virtual machines. Various programs are run on a computing device as one or more processes, each process including one or more threads. An operating system manages scheduling of the threads for execution on one or more processors of the computing device. A typical thread scheduler (implemented by any operating system) will schedule threads based on priority and importance. When there are no threads left to schedule, an "idle thread" is executed which engages with processor power management, achieving more power savings the longer the processor is in the idle thread. In this traditional thread scheduler implementation, all threads have higher priority compared to the idle thread, which implies no work.

However, in the forced idle state discussed herein, the operating system determines an importance of the threads running on the computing device, such as assigning the importance of the threads as critical or non-critical. The operating system determines when there are no threads having at least a threshold importance, and forces the one or more processors into an idle state in response to determining that there are no threads having at least the threshold importance. This threshold importance can be threads that are of critical importance, so the operating system forces the one or more processors into an idle state in response to determining that there are no critical threads to be scheduled for execution. Thus, in the forced idle state, threads that are classified as non-critical are not given priority over the idle thread.

The forced idle state of a device component is a low power state in which one or more of various actions are taken to reduce power consumption by the device component. The action can include ceasing execution of program instructions, duty cycling the device component (e.g., reducing the amount of time that the device is operational), changing the performance level of the device component (e.g., reducing a processor that can operate at 1 gigahertz (GHz) to operating at 200 megahertz (MHz)), and so forth. Power to the component can also be cut, so the component does not consume power while in the idle state. The component can be brought out of the idle state in response to various different events, such as an external device interrupt or expiration of a hardware timer of the computing device.

Forcing the one or more components into a forced idle state in response to determining that there are no threads having at least the threshold importance allows the one or more components to enter a low power consumption mode despite there being one or more threads that are at less than the threshold importance desiring to be scheduled. Thus, rather than employing waterfall techniques where the one or more components do not enter the idle state until there are no threads to be scheduled, the techniques discussed herein cause the one or more components to enter the idle state despite the presence of threads (e.g., non-critical threads) that are to be scheduled. Entering idle state reduces power consumption by the one or more components, resulting in extended battery life for the computing device.

FIG. 1 is a block diagram illustrating an example computing device 100 implementing the forced idle state for device components in accordance with one or more embodiments. Computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality (VR) devices, augmented reality (AR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 100 may range from a full resource device with substantial memory and processor resources (e.g., personal computers, game consoles) to a low resource device with limited memory and/or processing resources (e.g., traditional set-top boxes, hand-held game consoles).

Computing device 100 includes a processor 102, an operating system 104, one or more applications 106, and one or more input/output (I/O) components 108. The processor 102 supports multiple different operational states, including a forced idle state. In the forced idle state, power consumption by the processor 102 is reduced relative to at least one other operational state of the processor 102. In one or more embodiments, the processor 102 executes no instructions and consumes little power relative to other power states of the processor 102, although can be restarted or resumed in response to various events. In one or more embodiments, when in the forced idle state the processor 102 consumes the lowest amount of power of any of the operational states supported by the processor 102. The processor 102 can include one or more cores. When the processor 102 enters the forced idle state, each core of the processor 102 enters the forced idle state. Alternatively, in the forced idle state power consumption by the processor 102 can be reduced in other manners, such as by duty cycling the processor 102, changing the performance level of the processor 102, and so forth.

Although a single processor 102 is illustrated in FIG. 1, it should be noted that the computing device 100 can include any number of processors, each having any number of cores. In one or more embodiments, each processor in the computing device supports the forced idle state.

Additionally or alternatively, one or more additional components of the computing device 100 can support the forced idle state. In one or more embodiments, these additional components can include hardware components, such as one or more of I/O components 108. The additional hardware components can also be components that would otherwise prevent the processor 102 from entering a deep power saving mode (e.g., entering the forced idle state), and such additional hardware components can be put into the forced idle state along with, or prior to, the processor 102 being put into the forced idle state.

These additional components that can support the forced idle state can also be virtual machines running on the computing device 100. A virtual machine refers to a software implementation of a computing device (or other machine or system) that can run programs analogous to a physical computing device. The virtual machine includes one or more virtual processors that are similar to (but software implementations of) the physical processors of a computing device. An operating system as well as other applications can execute on the virtual processors as they would execute on a physical processor—the operating system and other applications executing on the virtual processor need have no knowledge that they are executing on a virtual processor.

The operating system 104 manages execution of the applications 106. The applications 106 can be any of a variety of different types of applications, such as productivity applications, gaming or recreational applications, utility applications, and so forth. The operating system 104 itself can also be made up of multiple programs and the operating system 104 manages execution of those modules or programs as well.

The I/O components 108 include various components or modules configured to output data or instructions from the computing device 100 and/or receive data or instructions for the computing device 100. The I/O components, include for example, communication components (e.g., supported wireless and/or wired communication), user output components (e.g., display components), user input components (e.g., keyboards), and so forth.

The applications 106 and the operating system 104 are executed as one or more processes 112 on the computing device 100. Each process 112 is an instantiation of an application 106 or a part of (e.g., a module of) the operating system 104. Each process 112 typically includes more threads 114. However, in some situations a process 112 does not include multiple threads 114, in which case the process can be treated as a single thread process.

The operating system 104 manages execution of the applications 106 by scheduling execution of the threads 114 of the applications 106. The operating system 104 also schedules execution of the threads 114 of programs of the operating system 104. Scheduling a thread for execution refers to informing the processor 102 to execute the instructions of the thread. Additionally or alternatively, scheduling a thread for execution can include informing another hardware component to execute the instructions of the thread.

The operating system 104 includes a scheduler 120 and a forced idle state module 122. The scheduler 120 determines which threads 114 to schedule at which times for execution by the processor 102. The scheduler 120 can make these scheduling decisions in a variety of different manners based on various public and/or proprietary techniques, such as based on the priorities assigned to threads by the operating system 104, based on how much execution time each thread has already been scheduled for, and so forth.

The forced idle state module 122 monitors the operation of the computing device 100 and, based on this monitoring, determines when to put a component of the computing device 100, such as the processor 102, into a forced idle state. Generally, the forced idle state module 122 determines when to begin the process of forcing a particular component of the computing device into the forced idle state. Once the determination is made to begin the process, the forced idle state module 122 begins quiescing the applications 106 that are running, which refers to putting the applications 106 in a state that allows their execution to be recovered after the particular component resumes from the forced idle state. The applications 106 can make their own determinations of what actions to take to put themselves in a state that allows their execution to be recovered after the particular component resumes from the forced idle state, such as saving data to a storage device of the computing device 100. Once the applications 106 are quiesced, the forced idle state module 122 determines whether any threads 114 of at least a threshold importance (e.g., critical threads) are still executing. In response to determining that no threads of at least the threshold importance are executing, and all components (e.g., I/O components 108) on the same socket as the particular component are in the appropriate state, the forced idle state module 122 forces the particular component into the forced idle state.

The importance of threads is discussed herein. The importance of a thread refers to how important it is for the thread to keep executing in order to provide the functionality desired by the user of the computing device 100. For example, if the user has requested playback of music on the computing device 100, then threads that are executing to provide the requested playback are very important to keep executing in order to provide the desired functionality. Other threads, such as a thread that is performing various maintenance or housekeeping functionality for the computing device 100 is typically not as important to keep executing in order to provide the desired functionality.

In one or more embodiments, each thread has an importance of either critical or non-critical. Which threads are critical and which threads are non-critical can be determined in different manners, such as by the forced idle state module 122 maintaining a list of programs that are authorized to prohibit the forced idle state module 122 from forcing the components of the computing device 100 into a forced idle state. These programs can be applications 106 and/or programs of the operating system 104. The process threads 114 that are running for each program authorized to prohibit the forced idle state module 122 from forcing the components of the computing device 100 into the forced idle state can have an importance of critical or non-critical; all other process threads 114 have an importance of non-critical. The threads that can have an importance of critical or non-critical notify the forced idle state module 122 of when they are running and are to keep running. The threads are configured to notify the forced idle state module 122 that they are to keep running in situations in which they are providing functionality of a key scenario for the computing device 100. A key scenario is functionality requested or desired by a user of the computing device 100. Examples of key scenarios include playing back audio (e.g., in the background by a music playback application), an application downloading or sending email, an application sending a push notification (e.g., to another device or service), or a program performing an update to the operating system 104.

Although discussions are included herein of the importance being one of two different importances (e.g., either critical or non-critical), it should be noted that alternatively there can be any number of different importances. For example, each thread can be assigned an importance (also referred to as an importance level) of A, B, or C, with A being the most important to provide the functionality requested or desired by a user of the computing device 100, C being the least important to provide the functionality requested or desired by a user of the computing device 100, and B being more important to provide the functionality requested or desired by a user of the computing device 100 than C but less important than A.

Figure 2:
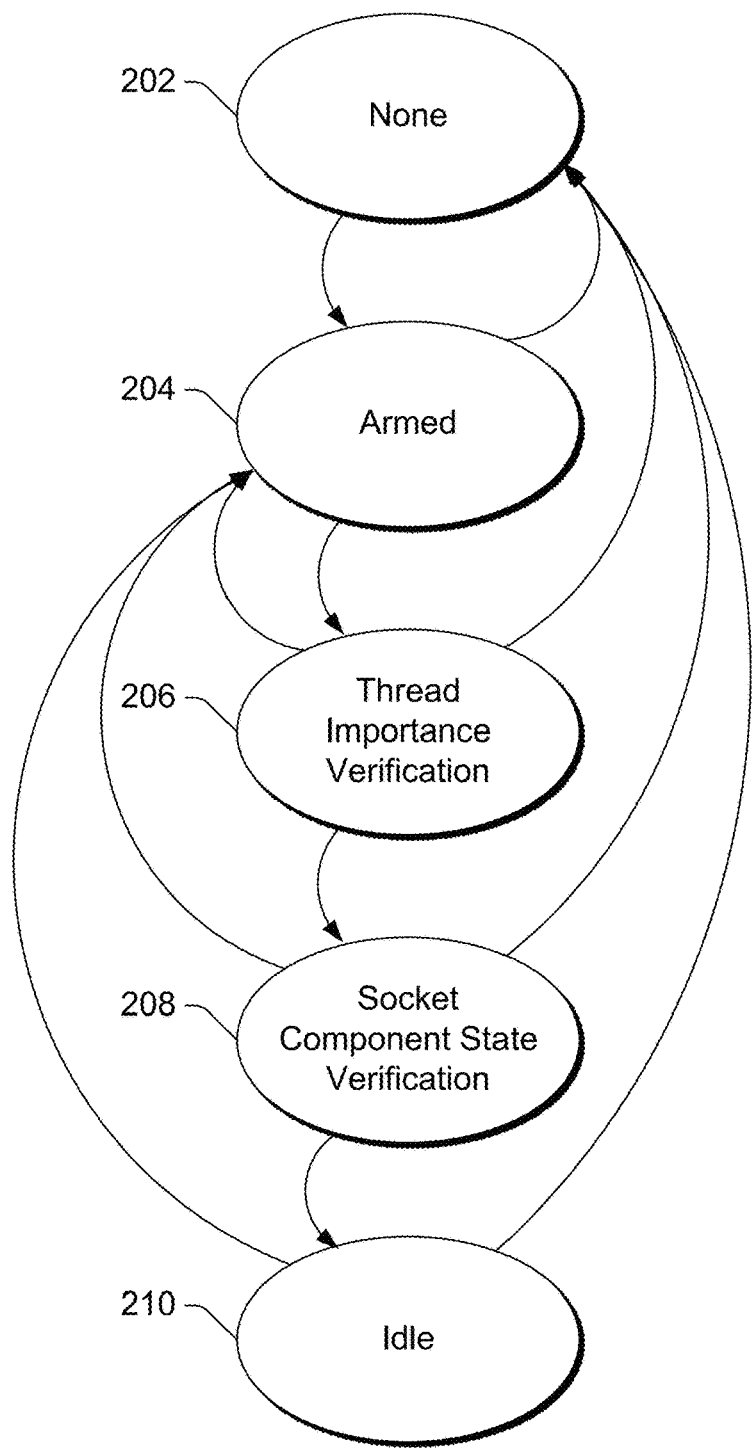
FIG. 2 illustrates an example state diagram for a computing device implementing the forced idle state for device components.

FIG. 2 illustrates an example state diagram 200 for the computing device 100 implementing the forced idle state for device components. The state diagram 200 illustrates five states: none state 202, armed state 204, thread importance verification state 206, socket component state verification state 208, and forced idle state 210. In the none state 202, the computing device 100 has not yet determined to begin the process of forcing a device component into the forced idle state. In the forced idle state 210, the processor 102 is in the forced idle state. In the forced idle state 210 various actions are taken to reduce power consumption by the device component, such as ceasing execution of program instructions, duty cycling the device component, changing the performance level of the device component, and so forth. The computing device 100 transitions from the none state 202 to the forced idle state 210 through the armed state 204, the thread importance verification state 206, and the socket component verification state 208. The computing device 102 can transition back to the none state 202 from any of the armed state 204, the thread importance verification state 206, the socket component verification state 208, and the forced idle state 210.

The computing device 100 transitions from the none state 202 to the armed state 204 in response to a determination that a device component is to begin the process of being forced into the forced idle state. This determination is made in various manners. In one or more embodiments, this determination to begin the process of forcing the device component into the forced idle state is made in response to a user input requesting to enter a standby mode, such as the user pressing a button of the computing device 100 or providing a verbal command to enter the standby state. This standby mode can be a connected standby mode in which the computing device 100 is in a low power mode, but is still able to maintain connections and communication with various services or devices (e.g., an email service). Additionally or alternatively, this determination to begin the process of forcing the idle state is made in response to various other conditions being satisfied or events occurring on the computing device 100. For example, this determination to begin the process of forcing the device component into the forced idle state can be made in response to detecting that a display of the computing device 100 has been powered off or that a lock screen of the computing device 100 is displayed.

By way of another example, this determination to begin the process of forcing the device component into the forced idle state can be made in response to determining that certain functionality of the computing device 100 has been invoked. For example, the computing device 100 may support panel self refresh functionality that allows certain display hardware, such as a video processor, to be shut down in certain circumstances, such as when a static image is displayed. If such functionality is supported on the computing device 100, the determination can be made to begin the process of forcing the device component into the forced idle state in situations in which the panel self refresh functionality determines to shut down the video processor and/or other display hardware.

By way of another example, this determination to begin the process of forcing the idle state can be made in response to certain programs running on the computing device 100. For example, if the computing device 100 is running a program that does not expect direct user interaction for a threshold amount of time (e.g., two seconds), such as a PowerPoint® presentation software program, then the determination can be made to begin the process of forcing the device component into the forced idle state. Or, if the computing device 100 is running in an electronic reader mode (e.g., to allow the user to read e-books), the operating system can "throttle" activity by periodically applying the forced idle state. E.g., in electronic reader mode, processes can be throttled by forcing the processor 102 into the forced idle state for 100 milliseconds every 1 second. This may not cause any perceptible delay to the user, but still reduce power consumption.

By way of another example, this determination to begin the process of forcing the device component into the forced idle state can be made in response to a thermal warning in the computing device 100. For example, a temperature sensor in the computing device 100 can indicate that the temperature of the computing device 100 exceeds a threshold temperature (e.g., 60 degrees Celsius), and make the determination to begin the process of forcing the device component into the forced idle state to reduce power consumption and stabilize the temperature of the computing device 100.

In the armed state 204, the forced idle state module 122 quiesces the computing device 100, including quiescing the programs that are running on the computing device 100, including applications 106 and programs of the operating system 104. Quiescing a program refers to putting the program in a state that allows execution of the program to be paused as a result of computing device 100 entering a standby or idle state, and resume execution of the program after exiting the standby or idle state. What actions are to be taken to quiesce a program vary by program and are performed by the program. These actions can be, for example, setting particular state information, saving data or state information, and so forth. Additionally or alternatively, quiescing a program can refer to putting the program in a state that allows execution of the program to be paused as a result of the device component entering the forced idle state, and resume execution of the program after exiting the forced idle state.

In one or more embodiments, to quiesce a program, the forced idle state module 122 sends a notification to the program to put itself in a state that allows execution of the program to be paused as a result of computing device 100 entering a standby or idle state, and resume execution of the program after exiting the standby or idle state. The forced idle state module 122 can assume that the program will do so within a threshold amount of time (e.g., 1 or 2 seconds), or alternatively can wait until the program returns confirmation to the forced idle state module 122 that the program has entered a state allowing its execution to be resumed after being paused. The forced idle state module 122 also notifies the scheduler 120 to cease scheduling the programs, either after the threshold amount of time has elapsed or the program has returned confirmation that it has entered a state allowing its execution to be resumed after being paused.

Quiescing the computing device 100 also optionally includes performing various other actions on the computing device 100. These actions include, for example, turning on various resiliency mechanisms in the computing device 100, turning off network communication hardware, caching I/O rather than writing data to a disk drive, and so forth.

The computing device 100 can transition from the armed state 204 back to the none state 202 or to the thread importance verification state 206. If an event occurs or condition is satisfied indicating that the device component is not to be put into a forced idle state, then the computing device 100 transitions back to the none state 202. Such an event or condition being satisfied can be, for example, whatever events or conditions that caused the determination to be made to begin the process of forcing the device component into the forced idle state being undone. For example, if the event that caused the determination to be made to begin the process of forcing the device component into the forced idle state is the display of the computing device 100 being powered off, then powering on the display of the computing device 100 can cause the computing device 100 to transition back to the none state 202. After the quiescing of the computing device 100 has completed, if no event has occurred while in the armed state 204 to cause the computing device 100 to transition back to the none state 202, the computing device 100 transitions to the thread importance verification state 206.

In the thread importance verification state 206 the forced idle state module 122 checks whether there are any threads executing on the computing device 100 that have at least a threshold importance. For example, in the thread importance verification state 206 the forced idle state module 122 checks whether there are any critical threads executing on the computing device 100.

The computing device 100 can transition from the thread importance verification state 206 back to the none state 202, back to the armed state 204, or to the socket component verification state 208. If an event occurs or condition is satisfied indicating that the device component is not to be put into a forced idle state, then the computing device 100 transitions back to the none state 202 or alternatively back to the armed state 204. Such an event or condition being satisfied can take various forms as discussed above. If there are no threads executing on the computing device 100 that have at least a threshold importance (e.g., no critical threads executing on the computing device), and no event has occurred while in the thread importance verification state 206 to cause the computing device 100 to transition back to the none state 202 or the armed state 204, the computing device 100 transitions to the socket component verification state 208.

In the socket component verification state 208 the forced idle state module 122 checks whether all additional components (e.g., I/O components 108) on the same socket as the device component being forced into the forced idle state are in the appropriate state. This appropriate state for such an additional component refers to a state in which power to the additional component can be cut and the additional component resume proper operation upon power to the additional component being restored. Various actions can be taken by the additional component to put itself in the appropriate state, such as the additional component saving its context (e.g., various data and state information) to a disk or other storage device.

In one or more embodiments, firmware of the computing device 100 provides to the forced idle state module 122 a notification of the additional components on the same socket as the device component being forced into the forced idle state and the appropriate state for each such additional component. In the socket component verification state 208, the forced idle state module 122 notifies each additional component on the same socket as the device component being forced into the forced idle state to put itself in the appropriate state, and waits for each such additional component to put itself into the appropriate state. The forced idle state module 122 can determine when each such additional component is in the appropriate state in various manners, such as receiving a response from each additional component when the additional component is in the appropriate state. It should be noted that in situations in which the computing device 100 includes multiple device components being forced into the forced idle state (e.g., multiple processors), the forced idle state module 122 waits for each additional component on the same socket as any of the multiple device components being forced into the forced idle state to be in the appropriate state.

The computing device 100 can transition from the socket component verification state 208 back to the none state 202, back to the armed state 204, or to the forced idle state 210. If an event occurs or condition is satisfied indicating that the device component being forced into the forced idle state is not to be put into a forced idle state, then the computing device 100 transitions back to the none state 202 or alternatively back to the armed state 204. Such an event or condition being satisfied can take various forms as discussed above. If each component on the same socket as the processor 102 is in the appropriate state, and no event has occurred while in the socket component verification state

208 to cause the computing device 100 to transition back to the none state 202 or the armed state 204, the computing device 100 transitions to the forced idle state 210.

In the forced idle state 210, the device component is forced into and remains in the forced idle state. In one or more embodiments, the device component is forced into the forced idle state by executing various commands on the device component that put the device component into the idle state and cut power to the device component. Alternatively, the device component is forced into the forced idle state by taking other actions, such as duty cycling the device component, changing the performance level of the device component, and so forth. The specific commands executed can vary for different processors. The computing device 102 can transition from the forced idle state 210 back to the none state 202, back to the armed state 204, or can remain in the forced idle state 210. In one or more embodiments, the computing device 102 remains in the forced idle state 210 until one of two conditions are satisfied: one is a device interrupt, another is expiration of a hardware timer on the computing device 102. In response to either of these two conditions being satisfied, the computing device transition back to the none state 202 or alternatively back to the armed state 204.

The device interrupt is an interrupt generated by hardware of the computing device 100. In one or more embodiments, the device interrupt is generated by a user input to the computing device 100, such as pressing a button to turn on the display of the computing device 100.

The expiration of the hardware timer is expiration of a hardware timer set prior to the device component entering its forced idle state. The hardware timer can be set by the forced idle state module 122, or alternatively as part of the commands executed by the device component to enter the forced idle state. In one or more embodiments, prior to entering the forced idle state, based on policy of the operating system 104 the forced idle state module 122 sets the hardware timer. For example, the forced idle state module 122 identifies a set of critical timers (e.g., software or hardware timers) in the computing device 100, identifies the next timer of this set of critical timers to expire, and sets the hardware timer to expire at the same time as this next timer. Thus, the hardware timer will cause the computing device 100 to exit the forced idle state 210 in response to the next one of the set of critical timers that expires. Critical timers can be determined in a variety of different manners, such as being specified by the program that set the timer. Examples of critical timers include a timer set to cause a network connection to be kept alive, a timer set to cause reboot of the computing device 100 in response to a program update, and so forth.

Thus, the computing device 100 will exit the forced idle state in response to either a device interrupt or the hardware timer expiring. This allows the computing device 100 to perform the desired work (e.g., resume a full power state in response to the user request to exit standby mode) or perform other critical work (e.g., keep a network connection alive) of the computing device 100.

In the forced idle state 210, the forced idle state module 122 forces one or more device components into a forced idle state. It should be noted that the forced idle state module 122 forces the one or more device components into the forced idle state despite there being threads that desire to execute. Those threads are threads that the forced idle state module 122 has determined to no satisfy the threshold importance (e.g., are non-critical threads). The forced idle state module 122 thus improves battery life by forcing the one or more device components into the forced idle state in situations where work is to be done (e.g., non-critical threads executed), but the forced idle state module 122 determines that such work is low enough importance that it need not delay the one or more device components entering the forced idle state.

The forced idle state module 122 can force the one or more device components into a forced idle state in a variety of different manners. In situations in which the forced idle state module 122 forces multiple device components into the forced idle state, the forced idle state module 122 may do additional work such as forcing the multiple device components into the forced idle state in a particular sequence. This sequence can be determined based on requirements or design of the hardware (e.g., of the device components) that indicate one device component is to enter a low power mode prior to another device component.

In one or more embodiments, the forced idle state module 122 forces the processor 102 into a forced idle state by communicating a request to the scheduler 120 to execute an idle thread on the processor 102. In situations in which the computing device 100 includes multiple processors, the forced idle state module 122 communicates a request to the scheduler 120 to execute an idle thread on each of the multiple processors. The idle thread includes various commands that put the processor 102 into the forced idle state. Typically, the idle thread is the lowest priority thread in the computing device 100 and the scheduler 120 schedules any other thread 114 prior to scheduling the idle thread. However, in response to the request from the forced idle state module 122 to schedule the idle thread, the scheduler 120 proceeds to schedule the idle thread despite the presence of other threads 114 requesting to be scheduled. This effectively increases the priority of the idle thread to a higher priority than other threads that are deemed to not satisfy the threshold importance (e.g., the non-critical threads).

Alternatively, the forced idle state module 122 forces the processor 102 into a forced idle state by queueing (e.g., making) a deferred procedure call (DPC) or other software generated interrupt on the processor 102. In response to the DPC or other software generated interrupt, other threads 114 on the computing device 100 are preempted and the forced idle state module 122 executes. The forced idle state module 122 executes the various commands to put the processor 102 into the forced idle state. These commands are the same commands as would be executed by the idle thread, but instead are executed by the forced idle state module 112. Thus, rather than having the idle thread scheduled before other threads, using the DPC or other software generated interrupt does not alter the priority of the idle thread. Rather, the DPC or other software generated interrupt is used to execute the commands that the idle thread would execute to put the processor 102 into the forced idle state.

Alternatively, the forced idle state module 122 forces the processor 102 into a forced idle state by freezing user mode threads. The operating system 104 can have different threads that execute in different modes, including a privileged mode (e.g., kernel mode) and a non-privileged mode (e.g., user mode). Threads executed in kernel mode have access to additional functionality and resources of the computing device 100 that threads executing in user mode do not have. Although referred to herein as kernel mode and user mode, other privileged and non-privileged, respectively, modes can alternatively be used. Programs run by the operating system 104, such as applications 106, run in user mode.

Freezing a user mode thread refers to ceasing execution of the user mode thread and scheduling an idle thread. When forcing the processor 102 into a forced idle state by freezing user mode threads, the threads executing in the user mode are preempted by the idle thread, but threads executing in the kernel mode are not preempted by the idle thread. Thus, the processor 102 does not enter the forced idle state until all kernel mode threads having higher priority than the idle thread (which is typically all kernel mode threads) have executed.

Freezing user mode threads can be performed in different manners. In one or more embodiments, the forced idle state module 122 communicates a request to the scheduler 120 to schedule a software interrupt on all threads executing in the user mode. The software interrupt preempts any thread running in the user mode process, and executes when the threads is not holding any critical sections of memory in the operating system kernel. This critical sections are known to the operating system 104 (and thus to the scheduler 120). When executed, the software interrupt tags the thread to be frozen as soon as it switches back into normal context, and then the software interrupt ceases execution and normal (non-interrupted) execution of the thread resumes. Upon resuming execution of the thread, the thread freezes itself (stops executing). Kernel mode threads can then complete executing, after which the idle thread is executed on the processor 102 and the processor 102 is put into the forced idle state.

Alternatively, the forced idle state module 122 forces a device component into a forced idle state by duty cycling the device component. Duty cycling the device component refers to altering the amount of time that the device is operational, and typically refers to reducing the amount of time that the device is operational. For example, duty cycling the device component can reduce the device component from being operation 50% of the time to being operational 10% of the time.

Alternatively, the forced idle state module 122 forces a device component into a forced idle state by changing the performance level of the device component. In one or more embodiments, this changing of the performance level of the device component is reducing the speed at which the device component runs. For example, a device component may be able to operate at 400 MHz, and is reduced to operate at 50 MHz.

Alternatively, for a device component that is a virtual machine, the forced idle state module 122 forces a device component into a forced idle state by having scheduling of the virtual machine cease. Having the scheduling of virtual machine ceased can be performed in different manners, such as by informing a virtual machine manager (e.g., a hypervisor), to cease scheduling the virtual machine.

Figure 3:
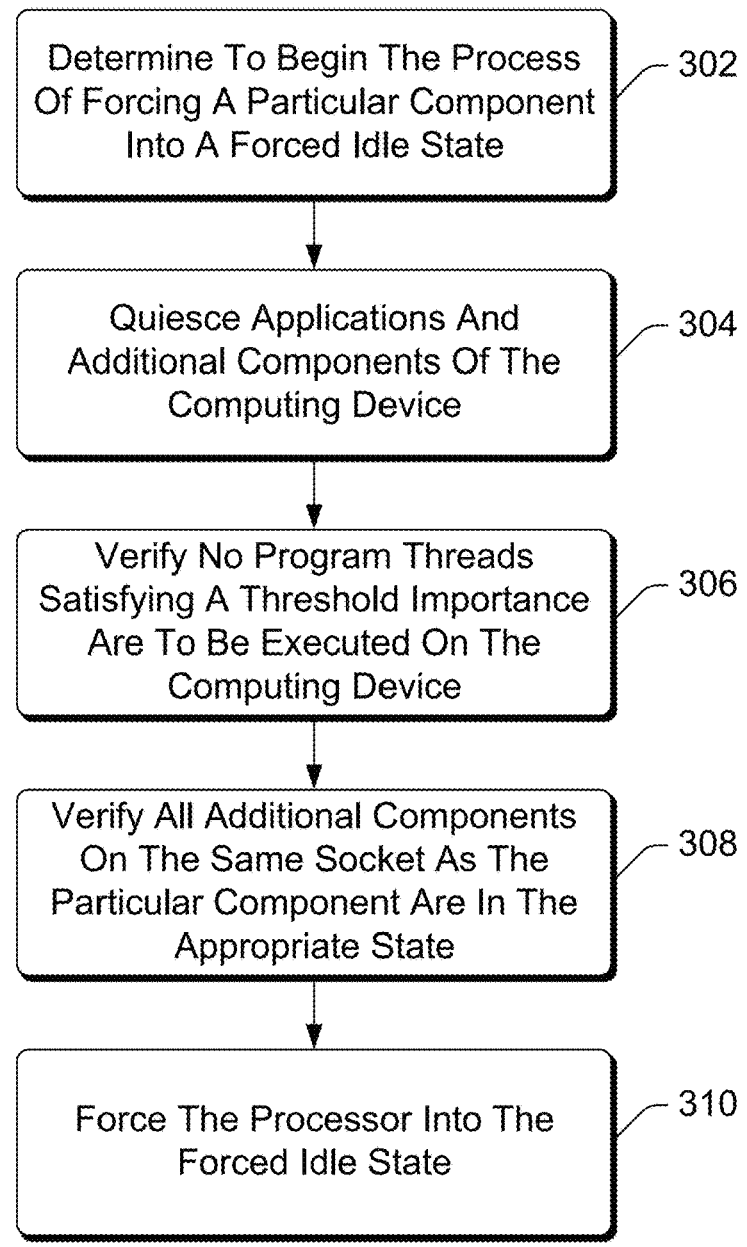
FIG. 3 is a flowchart illustrating an example process for a device implementing the forced idle state for device components in accordance with one or more embodiments.

FIG. 3 is a flowchart illustrating an example process 300 for a device implementing the forced idle state for device components in accordance with one or more embodiments. Process 300 is carried out by a computing device, such as computing device 100 of FIG. 1, and can be implemented in software, firmware, hardware, or combinations thereof. Process 300 is shown as a set of acts and is not limited to the order shown for performing the operations of the various acts. Process 300 is an example process for implementing the forced idle state for device components; additional discussions of implementing the forced idle state for device components are included herein with reference to different figures.

In process 300, a determination is made to begin the process of forcing a particular device component into the idle state (act 302). This determination can be made in response to various events or conditions as discussed above, such as user input requesting to enter a standby mode, certain functionality of the computing device being invoked, certain programs running on the computing device, and so forth. This particular device component can be a processor of the computing device, or other hardware component or virtual machine as discussed above.

Applications and additional components of the computing device are then quiesced (act 304). This quiescing of the computing device includes, for example, putting programs in a state that allows execution of the program to be paused as a result of the computing device entering an idle state and execution of the program resumed after exiting the idle state, as well as performing additional actions on the computing device such as turning off network communication hardware as discussed above.

A verification is made that no program threads satisfying a threshold importance are to be executed on the computing device (act 306). In one or more embodiments, this threshold importance is critical threads, so a verification is made in act 306 that no critical threads are scheduled to be executed on the computing device.

Along with this verification that no program threads satisfying a threshold importance are to be executed on the computing device, various additional verifications can be made. For example, in one or more embodiments, a verification is also made that there is no other activity such as timers set to expire, deferred procedure calls or other software interrupts made, and so forth that would cause the computing device to execute a program thread that satisfies the threshold performance.

Additionally, a verification is made that all additional components on the same socket as the particular device component are in the appropriate state (act 308). This appropriate state can vary by component, and in one or more embodiments each additional component puts itself in the appropriate state and notifies the forced idle state module that it is in the appropriate state as discussed above.

The particular device component is then forced into the idle state (act 310). The particular device component can be forced into the idle state in different manners as discussed above, such as by scheduling an idle thread (effectively having a higher priority than the threads that did not satisfy the threshold importance in act 306), making a deferred procedure call, or freezing user mode threads as discussed above.

It should be noted that process 300 is an example, and that in certain situations not all of the acts shown in process 300 need be performed. For example, applications and components may run with an expectation that the device components can be forced into the forced idle state at any time, and in such situations act 304 need not be performed. By way of another example, there may be no additional components on the same socket as the particular component being forced into the forced idle state, and in such situations act 308 need not be performed.

The techniques discussed herein support various usage scenarios. In one or more embodiments, the forced idle state module discussed herein detects when the processor(s) of a computing device can be put in a forced idle state and determines whether there are critical threads running that should keep running (and thus that the processor(s) should not be put in the idle state). These critical threads are threads the support key usage scenarios of the computing device, such as playing back music, sending and receiving email, and so forth. If no such critical threads are running, the forced idle state module forces the processor(s) into the forced idle state despite other non-critical threads that may be desiring to execute (e.g., to be scheduled for execution).

The forced idle state module need not wait to execute an idle thread until no other threads are requesting to be scheduled (e.g., a waterfall down to the idle thread). Battery power is thus conserved by putting the processor(s) into the forced idle state unless the computing device is currently being used in a key usage scenario.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 4:
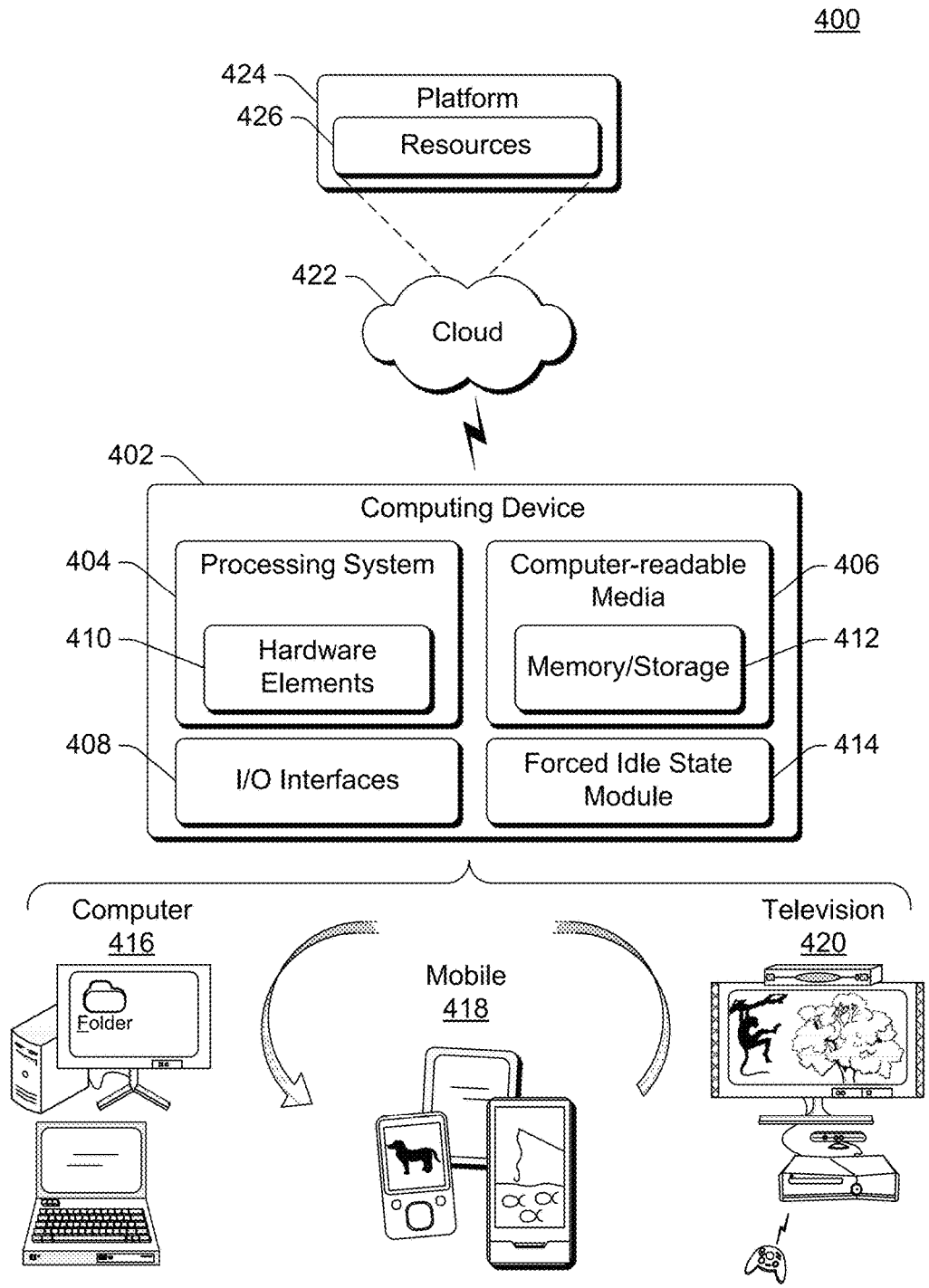
FIG. 4 illustrates an example system that includes an example computing device that is representative of one or more systems and/or devices that may implement the various techniques described herein.

FIG. 4 illustrates an example system generally at 400 that includes an example computing device 402 that is representative of one or more systems and/or devices that may implement the various techniques described herein. The computing device 402 may be, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O Interfaces 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 406 is illustrated as including memory/storage 412. The memory/storage 412 represents memory/storage capacity associated with one or more computer-readable media. The memory/storage 412 may include volatile media (such as random access memory (RAM)) and/or nonvolatile media (such as read only memory (ROM), Resistive RAM (ReRAM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

The one or more input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 402 may be configured in a variety of ways as further described below to support user interaction.

The computing device 402 also includes a forced idle state module 414. The forced idle state module 414 provides various functionality to force components of the computing device 402 (e.g., the hardware elements 410) into a forced idle state as discussed above. The forced idle state module 414 is typically implemented as part of an operating system of the computing device 402, although alternatively can be implemented separately from the operating system. The forced idle state module 414 can implement, for example, the forced idle state module 122 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 410 and computer-readable media 406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of modules as a module that is executable by the computing device 402 as software may be achieved at least partially in hardware, e.g., through use of computer-readable storage media and/or hardware elements 410 of the processing system. The instructions and/or functions may be executable/operable by one or more articles of manufacture (for example, one or more computing devices 402 and/or processing systems 404) to implement techniques, modules, and examples described herein.

As further illustrated in FIG. 4, the example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 402 may assume a variety of different configurations, such as for computer 416, mobile 418, and television 420 uses. Each of these configurations includes devices that may have generally different constructs and capabilities, and thus the computing device 402 may be configured according to one or more of the different device classes. For instance, the computing device 402 may be implemented as the computer 416 class of a device that includes a personal computer, desktop computer, a multi-screen computer, laptop computer, netbook, and so on.

The computing device 402 may also be implemented as the mobile 418 class of device that includes mobile devices, such as a mobile phone, portable music player, portable gaming device, a tablet computer, a multi-screen computer, and so on. The computing device 402 may also be implemented as the television 420 class of device that includes devices having or connected to generally larger screens in casual viewing environments. These devices include televisions, set-top boxes, gaming consoles, and so on.

The techniques described herein may be supported by these various configurations of the computing device 402 and are not limited to the specific examples of the techniques described herein. This functionality may also be implemented all or in part through use of a distributed system, such as over a "cloud" 422 via a platform 424 as described below.

The cloud 422 includes and/or is representative of a platform 424 for resources 426. The platform 424 abstracts underlying functionality of hardware (e.g., servers) and software resources of the cloud 422. The resources 426 may include applications and/or data that can be utilized while computer processing is executed on servers that are remote from the computing device 402. Resources 426 can also include services provided over the Internet and/or through a subscriber network, such as a cellular or Wi-Fi network.

The platform 424 may abstract resources and functions to connect the computing device 402 with other computing devices. The platform 424 may also serve to abstract scaling of resources to provide a corresponding level of scale to encountered demand for the resources 426 that are implemented via the platform 424. Accordingly, in an interconnected device embodiment, implementation of functionality described herein may be distributed throughout the system 400. For example, the functionality may be implemented in part on the computing device 402 as well as via the platform 424 that abstracts the functionality of the cloud 422.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: determining to begin a process for forcing a component of the computing device into a forced idle state; verifying, at the computing device as part of the process for forcing the component into the forced idle state, that no program threads satisfying a threshold importance are to be executed on the computing device; and forcing, in response to determining that no program threads to be executed on the computing device satisfy the threshold importance, the component of the computing device into the forced idle state.

Alternatively or in addition to any of the above described methods, any one or combination of: the component comprising a processor of the computing device, the forced idle state comprising a low power state in which program instructions are not executed on the processor; the method being implemented by an operating system of the computing device; the method further comprising quiescing the computing device prior to verifying that no program threads satisfying at least the threshold importance are to be executed on the computing device; the verifying comprising checking a list of programs that are authorized to prohibit forcing a processor of the computing device into the forced idle state, determining whether threads of any programs on the list have indicated they are to keep running, and verifying, in response to no threads of any programs on the list having indicated they are to keep running, that no program threads satisfying the threshold importance are to be executed on the computing device; the computing device comprising multiple processors, and the forcing comprising forcing each of the multiple processors into the forced idle state; the forcing comprising scheduling an idle thread to execute on the component despite additional threads to be scheduled for execution on the computing device that do not satisfy the threshold importance, the idle thread executing one or more commands to put the component into the idle state; the forcing comprising queueing a deferred procedure call or other software generated interrupt for the component, the deferred procedure call or other software generated interrupt executing one or more commands to put the component into the idle state; the forcing comprising freezing all user mode threads on the computing device; the method further comprising exiting the forced idle state in response to a device interrupt on the computing device or expiration of a hardware timer of the computing device set based on policy of an operating system of the computing device; each of the program threads being a critical thread or a non-critical thread, and the verifying comprising verifying that no critical threads are to be executed on the computing device; the component comprising a processor of the computing device; the component comprising a virtual machine running on the computing device.

A computing device comprising: a processor; a forced idle state module including instructions that, when executed by the processor, cause the forced idle state module to: determine to begin a process for forcing a component of the computing device into a forced idle state; verify that no program threads that satisfy a threshold importance are to be executed on the computing device; and force, in response to determining that no program threads satisfy the threshold importance, the component into the forced idle state.

Alternatively or in addition to any of the above described computing devices, any one or combination of: each of the program threads being a critical thread or a non-critical thread, and wherein to verify that no program threads that satisfy the threshold importance are to be executed on the computing device is to verify that no critical threads are to be executed on the computing device; wherein to verify that no program threads that satisfy the threshold importance are to be executed on the computing device is to check a list of programs that are authorized to prohibit forcing the processor of the computing device into the idle state, determine whether threads of any programs on the list have indicated they are to keep running, and verify, in response to no threads of any programs on the list having indicated they are to keep running, that no program threads that satisfy the threshold importance are to be executed on the computing device; wherein to force the processor into the idle state is to schedule an idle thread to execute on the processor despite additional threads to be scheduled for execution on the computing device that do not satisfy the threshold importance, the idle thread executing one or more commands to put the processor into the idle state; wherein to force the processor into the idle state is to queue a deferred procedure call or other software generated interrupt for the processor, the deferred procedure call or other software generated interrupt executing one or more commands to put the processor into the idle state; wherein the forced idle state module is further to exit the idle state in response to a device interrupt on the computing device or expiration of a hardware timer of the computing device set based on policy of an operating system of the computing device; the component comprising a processor of the computing device; the component comprising a virtual machine running on the computing device.

A computing device comprising: one or more processors; a computer-readable storage medium having stored thereon multiple instructions that, responsive to execution by the one or more processors, cause the one or more processors to: determine to begin a process for forcing each of the one or more processors into a forced idle state; verify, as part of the process for forcing each of the one or more processors into the idle state, that no program threads that satisfy a threshold importance are to be executed on the computing device; and force, in response to determining that no program threads satisfy the threshold importance, each of the one or more processors into the forced idle state.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device having a processor executing instructions to provide an operating system with a scheduler configured to determine a time to execute a process thread by the processor, the method comprising:
  upon detecting, with the operating system, an operational event in the computing device, quiescing one or more applications currently executing on the computing device, the operational event including one or more of receiving an input from a user of the computing device to enter the computing device into a standby mode, invocation of a functionality of the computing device by the user, or execution of a program that does not expect direct user interaction for a threshold period; and
  upon quiescing the one or more applications, ceasing scheduling additional process threads with the scheduler;

determining, with the operating system, whether at least one of the additional process threads is required to provide a functionality of the computing device currently requested by the user; and in response to determining that none of the additional process threads is required to provide a functionality currently requested by the user, scheduling, with the scheduler, an idle threshold to be executed by the processor, the idle thread containing one or more commands execution of which puts the processor into a forced idle state, thereby conserving battery power in the computing device.

2. The method of claim 1, further comprising, executing, with the processor, the idle thread to put the processor in a lower power state than a current power state, wherein the processor does not execute instructions of the one or more applications in the lower power state.

3. The method of claim 1 wherein quiescing the one or more applications includes notifying, by the operating system, the one or more applications to put the one or more applications in a state that allows execution of the one or more applications to be paused but resumable subsequently.

4. The method of claim 1, further comprising:
in response to determining that none of the process thread is required to provide a functionality currently requested by the user,
determining whether power is removable from additional components of the computing device on the same socket as the processor; and
in response to determining that the power is removable from the additional components on the same socket as the processor, executing, with the processor, the idle thread to put the processor in the low power state.

5. The method of claim 1 wherein the determining whether at least one process thread is required to provide a functionality currently requested by the user comprising:
checking a list of applications that are authorized to prohibit forcing the processor of the computing device into the forced idle state;
determining whether any process threads of any applications on the list have indicated to keep running; and
indicating, in response to no process threads of any applications on the list having indicated to keep running, that the computing device does not have at least one process thread execution of which is required to provide a functionality currently requested by the user.

6. The method of claim 1 wherein the processor includes multiple cores, and wherein scheduling the idle thread includes scheduling an idle thread for each of the cores to forcing each of the multiple cores into the forced idle state.

7. The method of claim 1 wherein the processor includes multiple cores, and wherein scheduling the idle thread includes scheduling the idle thread for one of the cores to forcing the one of the multiple cores into the forced idle state but not scheduling an idle thread for other cores of the processor.

8. The method of claim 1, further comprising:
in response to determining that none of the process threads is required to provide a functionality currently requested by the user, queueing a deferred procedure call or a software generated interrupt for the processor in lieu of scheduling the idle thread, the deferred procedure call or the software generated interrupt executing one or more commands to put the processor into the forced idle state.

9. The method of claim 1, further comprising:
in response to determining that none of the process threads is required to provide a functionality currently requested by the user, freezing all user mode threads on the computing device in lieu of scheduling the idle thread.

10. The method of claim 1, further comprising exiting the processor from the forced idle state in response to a device interrupt on the computing device or expiration of a hardware timer of the computing device set based on a policy of the operating system of the computing device.

11. The method of claim 1 wherein determining whether at least one process thread is required to provide a functionality currently requested by the user includes determining whether the computing device has at least one process thread execution of which provides one of playing back audio, retrieving or sending an email, sending a push notification, or updating the operating system.

12. The method of claim 1 wherein the process threads are individually assigned with an importance level, and wherein determining whether at least one of the process threads is required to provide a functionality currently desired by the user includes determining whether at least one of the process threads has an importance level higher than a threshold level.

13. The method of claim 1, further comprising:
upon quiescing the one or more applications,
determining, with the operating system, whether the detected operational event in the computing device is undone;
in response to determining that the detected operational event in the computing device is undone, resuming the one or more quiesced applications and skipping the ceasing, determining, and scheduling operations; and
in response to determining that the detected operational event in the computing device is not undone, proceeding to the ceasing, determining, and scheduling operations.

14. A computing device, comprising:
a processor;
a battery operatively coupled to the processor to supply power to the processor; and
a memory operatively coupled to the processor, the memory containing instructions executable by the processor to provide an operating system and to cause the computing device to:
upon detecting, with the operating system, an operational event in the computing device,
notify the one or more applications to put the one or more applications in a state that allows execution of the one or more applications to be paused but resumable subsequently;
cease scheduling additional process threads to be executed by the processor;
determine whether at least one of the additional process threads is required to be executed by the processor to provide a functionality of the computing device currently requested by the user; and
in response to determining that none of the process threads is required to provide a functionality currently requested by the user, execute one or more commands, with the processor, to put a computing component of the computing device into a lower power state than a current power state of the computing component, thereby conserving battery power in the computing device.

15. The computing device of claim 14 wherein the memory contains additional instructions executable by the processor to cause the computing device to:
in response to determining that one of the process threads is required to provide a functionality currently requested by the user,
schedule the one of the process threads to be processed by the computing component; and
prevent the computing component from entering the lower power state.

16. The computing device of claim 14 wherein to determine whether at least one of the additional process threads is required to be executed by the processor to provide a functionality of the computing device currently requested by the user includes:
check a list of applications that are authorized to prohibit forcing the processor of the computing device into the forced idle state;
determine whether any process threads of any applications on the list have indicated to keep running; and
indicate, in response to no process threads of any applications on the list having indicated to keep running, that the computing device does not have at least one process thread execution of which is required to provide a functionality currently requested by the user.

17. The computing device of claim 14 wherein:
the computing component is the processor; and
to execute one or more commands includes one of:
schedule and execute an idle thread by the processor to put the processor in a lower power state than a current power state of the processor;
queue a deferred procedure call or a software generated interrupt for the processor, the deferred procedure call or the software generated interrupt executing one or more commands to put the processor into the lower power state; or
freeze execution of all user mode threads on the computing device by the processor.

18. A method implemented in a computing device having a processor executing instructions to provide an operating system, the method comprising:
upon detecting, with the operating system, an operational event in the computing device, quiescing one or more applications currently executing on the computing device;
ceasing scheduling additional process threads to be executed by the processor, the additional process threads individually being assigned a priority level;
determining, with the operating system, whether at least one of the additional process threads has a priority level higher than a predetermined threshold level; and
in response to determining that none of the additional process threads have a priority level higher than the predetermined threshold level,
scheduling, with the operating system, an idle threshold to be executed by the processor, the idle thread containing one or more commands to be executed by the processor; and
executing, with the processor, the one or more commands of the idle thread to put the processor into a lower power state than a current power state of the processor, the processor not executing any of the additional process threads in the lower power state, thereby conserving battery power in the computing device.

19. The method of claim 18 wherein:
the additional processor threads can have a first priority level or a second priority level lower than the first priority level;
the first priority level corresponds to a processor thread that is required to provide a functionality currently requested by a user of the computing device while the second priority level corresponds to another processor thread that is not required to provide a functionality currently requested by the user; and
determining whether at least one of the additional process threads has a priority level higher than a predetermined threshold level, includes determining whether at least one of the additional process threads has the first priority level.

20. The method of claim 18 wherein:
the additional processor threads can have a first priority level or a second priority level lower than the first priority level;
the first priority level corresponds to a processor thread that is required to provide a functionality currently requested by a user of the computing device while the second priority level corresponds to another processor thread that is not required to provide a functionality currently requested by the user, the functionality including one of playing back audio, retrieving or sending an email, sending a push notification, or updating the operating system; and
determining whether at least one of the additional process threads has a priority level higher than a predetermined threshold level, includes determining whether at least one of the additional process threads has the first priority level.

* * * * *